United States Patent [19]

Yamauchi et al.

[11] Patent Number: 4,928,253

[45] Date of Patent: May 22, 1990

[54] CONSECUTIVE IMAGE PROCESSING SYSTEM

[75] Inventors: Junichi Yamauchi; Kimiko Maejima; Kaoru Eguchi; Noriko Kabuyama, all of Yokohama, Japan

[73] Assignee: Fujitsu Limited, Kawasaki, Japan

[21] Appl. No.: 5,776

[22] Filed: Jan. 21, 1987

[30] Foreign Application Priority Data

Jan. 25, 1986 [JP] Japan ................................. 61-14444
Jan. 25, 1986 [JP] Japan ................................. 61-14443
Jan. 25, 1986 [JP] Japan ................................. 61-14442

[51] Int. Cl.$^5$ ............................................. G09G 1/28
[52] U.S. Cl. ................................... 364/521; 340/799; 365/230.04
[58] Field of Search ............................... 364/518–521, 364/900 MS File; 340/747, 798, 799, 800; 365/189, 230; 382/47

[56] References Cited

U.S. PATENT DOCUMENTS

| | | | |
|---|---|---|---|
| 4,520,358 | 5/1985 | Makino | 340/799 |
| 4,595,917 | 6/1986 | McCallister et al. | 340/798 X |
| 4,636,783 | 1/1987 | Omachi | 340/799 X |
| 4,644,502 | 2/1987 | Kawashima | 340/800 X |
| 4,723,226 | 2/1988 | McDonough et al. | 340/799 X |
| 4,755,810 | 7/1988 | Knierim | 340/799 X |
| 4,800,380 | 1/1989 | Lowenthal et al. | 340/799 X |
| 4,823,119 | 4/1989 | Ishii | 340/798 X |

*Primary Examiner*—Gary V. Harkcom
*Assistant Examiner*—H. R. Herndon
*Attorney, Agent, or Firm*—Staas & Halsey

[57] ABSTRACT

In a consecutive image processing system for smoothly and consecutively processing image data when transferring and displaying the image data stored in image memories and display memories, the system comprises: a host computer; an image control apparatus having at least a plurality of image memories divided into a plurality of memory areas for storing image frames having a display order, the display order being applied in such a manner that it is possible to perform a display based on either a memory switch or address switch, and a first microprocessor unit for commanding an enlargement rate, a memory transfer, and a display start based on a command from the host computer; and an image display apparatus having at least a plurality of display memories each divided into a plurality of memory areas corresponding to the image memory for storing image frames to be displayed, each image frame having a display order corresponding to the image memory, and a second microprocessor unit for commanding a memory switch and a start address of an enlarged image under an enlargement rate based on a command from the first microprocessor unit.

10 Claims, 15 Drawing Sheets

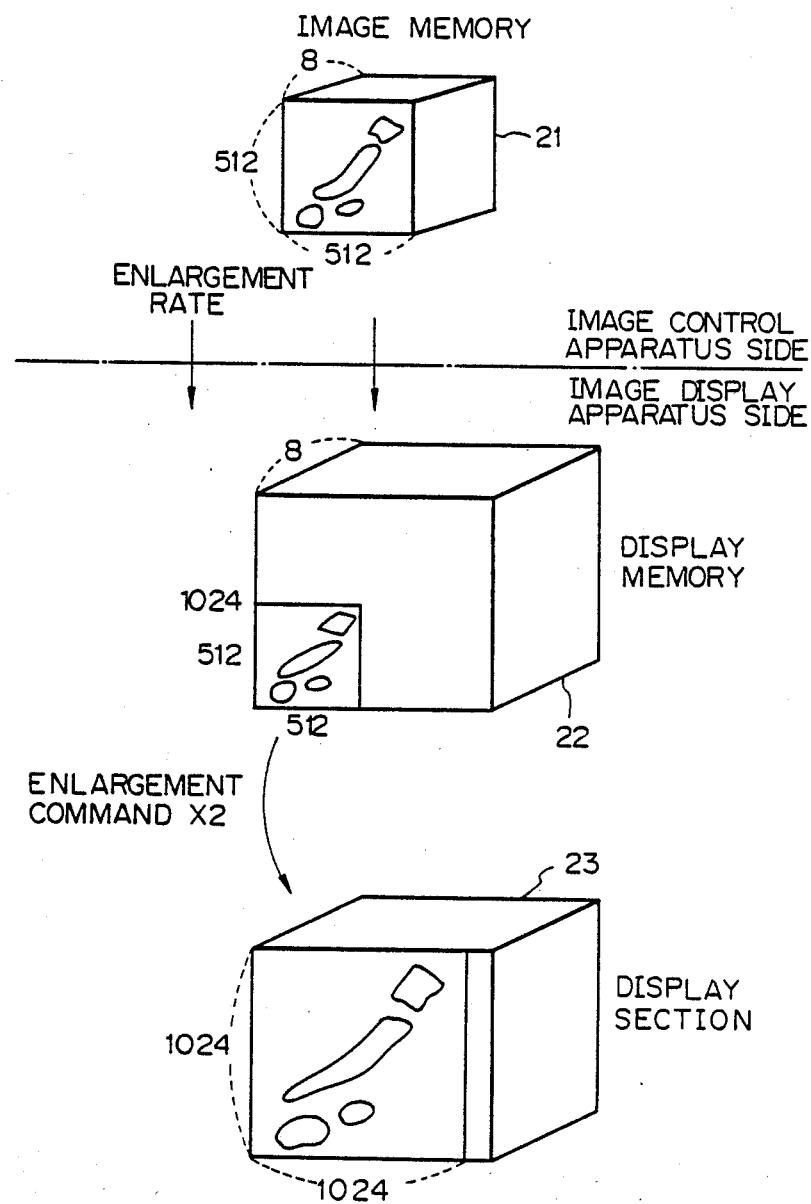

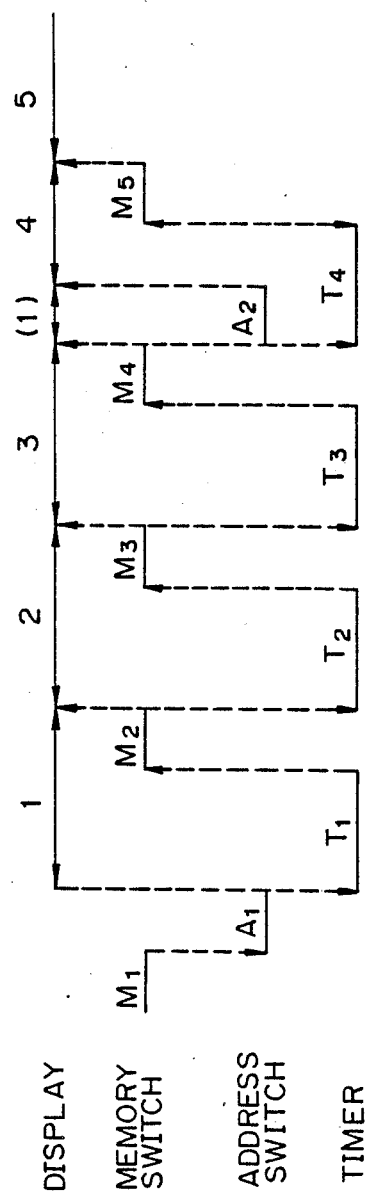

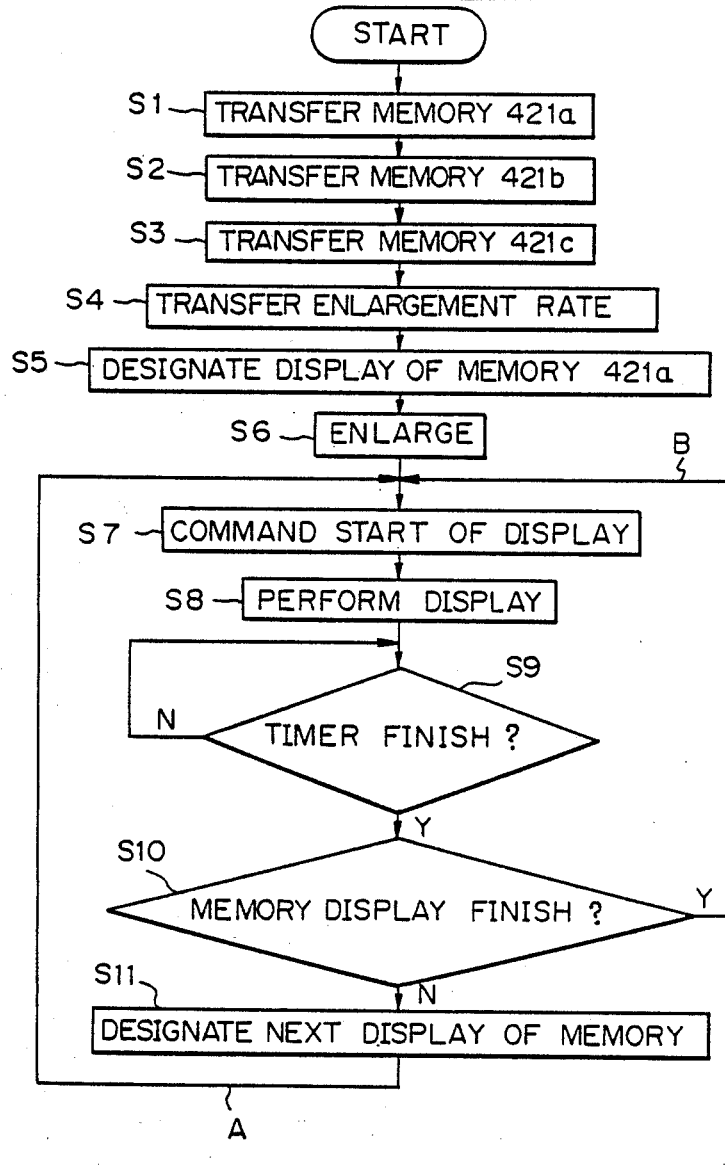

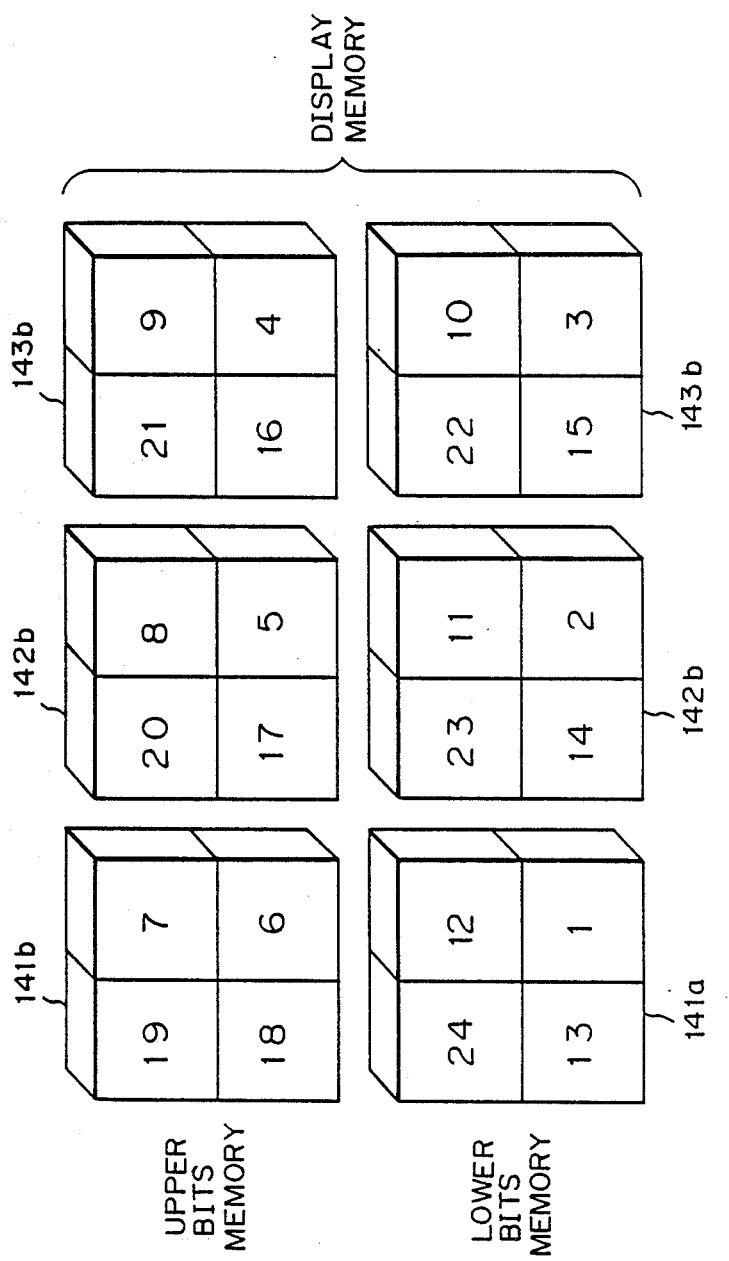

CONSECUTIVE IMAGE PROCESSING SYSTEM

BACKGROUND OF THE INVENTION

1. Field of the Invention

The present invention relates to a consecutive image processing system, more particularly, it relates to an improvement of moving images in the consecutive image processing system.

2. Description of the Related Art

Recently, with the greater development of digital techniques, especially of the Very Large Semiconductor Integration (VLSI) technique, many digital processing systems are widely employed in the field of broadcasting. As a result, it is possible to store, process and transmit the moving images at a high speed and with a superior quality and stability, compared with an analog processing method.

In the case of television (TV) broadcasting, the TV image is, in general, transmitted at thirty frames per second so that clear stable moving images can be obtained on a dislay device at the receiving side. In this case, however, it is difficult to rewrite the image data stored in all memory cells of each image memory at the desired transmission speed of the TV image, i.e., transmission speed of thirty frames per second (this phenomenon is called "real time processing").

Accordingly, a "loop-movie" technique, one type of consecutive image processing, has been developed to solve the above problem. In the "loop-movie" technique, the number of picture elements per frame is set to as low a number as possible, digital data corresponding to each frame is transmitted with a corresponding small number of bits, and thus the digital data is consecutively stored in the memories. Following these steps, the data is enlarged and displayed as consecutive images on the display device.

In general, there are many image processing procedures in the known digital image processing method, i.e., gradation processing, correction, space filtering processing, image moving, border extraction, and transmission band compression.

In TV broadcasting, the real time processing of moving images is performed by utilizing redundant space in the TV signal and by compressing the transmission band. Conventionally, many algorithms of the transmission band compression have been proposed, and there are two main methods of transmission band compression, i.e., an inner frame method and a frame interval method. The former method compresses the numbers of bit per one picture element in the TV image frame, and the latter method compresses the distance between adjacent frames by utilizing a high coefficient of correlation.

Other special effects besides the "loop-movie" technique are known in the digital image processing method, i.e., a freeze-frame effect, reduction effect, and enlargement effect. The freeze-frame effect is used for temporarily freezing (stopping) the moving images by utilizing the function whereby each moving image frame is stored in the form of digital information. The reduction effect is used for inlaying the image to an optional position on the display device, after reducing the image size. The enlargement effect is used for enlarging the image and displaying the enlarged image on the display device, after the image photographed by a camera has been reduced and transmitted to the display device.

Although it is difficult to perform the above various effects by an analog or optical processing method, it is easily possible to achieve the above effects by a digital processing technique. That is, these special effects can be performed by controlling the read/write addresses to a random access memory (RAM). The control of the read/write addresses is performed by a host computer.

In the consecutive image processing system utilizing the "loop-movie" technique as one of the above special effects, this technique is used, for example, for a weather forecast display in TV broadcasting. That is, during the weather forecast, changes of cloud position transmitted from a weather satellite are continuously displayed on a predetermined map. These position-change images can be performed by the "loop-movie" technique.

Conventionally, in the above case, definite image frames are compressed and transmitted from the image memory in the image control apparatus connected to the host computer to the display memories in the image display apparatus, and the transferred image is enlarged and displayed on the display device in the image display apparatus. That is, in the conventional technique, the contents of the image memory in the image control apparatus are transferred to the display memory in the image display apparatus and enlarged and displayed on the display device by corresponding them to a memory size of 1 to 1.

The various conventional techniques and the problems thereof will be explained in more detail hereinafter.

SUMMARY OF THE INVENTION

The object of the present invention is to provide a consecutive image processing system enabling a high speed, high quality, and high reliability consecutive image transfer and display by controlling the transfer and display of image data based on a command from a host computer.

In accordance with the present invention, there is provided a consecutive image processing system for smoothly and consecutively processing image data when transferring and displaying the image data stored in image memories and display memories. This system comprises: a host computer; an image control apparatus having at least a plurality of image memories divided into a plurality of memory areas for storing image frames in a display order, the display order being applied in such a manner that it is possible to perform a display based on either a memory switch or address switch operation, and a first microprocessor unit for commanding an enlargement rate, a memory transfer, and a display start based on a command from the host computer; and an image display apparatus having at least a plurality of display memories each divided into a plurality of memory areas corresponding to the image memory for storing image frames to be displayed, each image frame having a display order corresponding to that of the image memory, and a second microprocessor unit for commanding a memory switch and a start address of an enlarged image at an enlargement rate based on a command from said first microprocessor unit.

Moreover, there is provided a consecutive image processing system for smoothly and consecutively processing image data when transferring and displaying the image data stored in image memories and display memories, the system comprising: a host computer; an image control apparatus having at least an image memory divided into a plurality of memory areas for storing image frames in a display order, a timer for counting a transfer time and a display time, and a first microprocessor unit for commanding a memory transfer and a display start based on a command from the host computer; and an image display apparatus having at least two display memories, each display memory being alternately displayed, and when one display memory is displayed, the image data in the image memory is transferred to the other display memory, and a second microprocessor unit for commanding a memory switch and a start address based on a command from the first microprocessor unit.

Furthermore, there is provided a consecutive image processing system for smoothly and consecutively processing image data when transferring and displaying the image data stored in image memories and display memories, the system comprising: a host computer; an image control apparatus having at least an image memory divided into a lower bits portion and an upper bits portion, each portion being divided into a plurality of memory areas, two look-up tables for storing light and shade data of the image data corresponding to the portion, a timer for counting a transfer time and a display time, and a first microprocessor unit for commanding a look-up table transfer and a display start based on a command from the host computer; and an image display apparatus having at least a display memory divided into a lower bits portion and an upper bits portion corresponding to the image memory, each portion being alternately displayed, and when one display memory is displayed, the image data in the image memory is transferred to the other display memory, two look-up tables for storing contents corresponding to look-up tables in the image control apparatus, and a second microprocessor unit for commanding a memory switch and a start address based on a command from the first microprocessor unit.

Still further, there is provided a consecutive image processing system including a host computer, an image control apparatus and an image display apparatus, characterized in that the image display apparatus comprises at least a plurality of image memories each divided into a plurality of memory areas and each also divided into lower and upper bits portions for smoothly and consecutively processing image data when displaying the image data on a display device.

BRIEF DESCRIPTION OF THE DRAWINGS

In the drawings:

FIG. 2 shows perspective views of an image memory and a display memory in a prior art, including an enlarged display;

FIG. 6B is a view for explaining a memory switch and address switch of the display memories shown in FIG. 1;

FIGS. 7A and 7B are flowcharts for explaining the processing for transfer and display in the consecutive image processing system shown in FIG. 4;

FIG. 14 shows display memories according to still another embodiment of the present invention.

DESCRIPTION OF THE PREFERRED EMBODIMENTS

Before describing the preferred embodiments, an explanation will be given of conventional consecutive image processing methods and the problems thereof, for reference.

Figure 1:
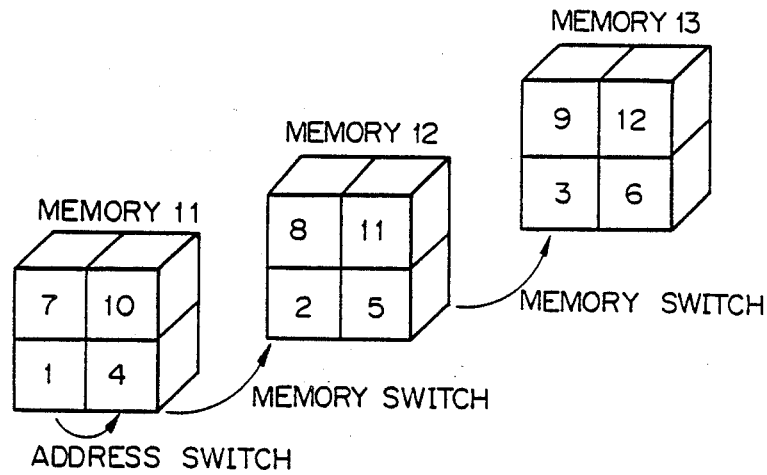
FIG. 1 shows perspective views of display memories in a prior art, each of the display memories being divided into four memory areas.

In FIG. 1, reference numbers 11 to 13 represent display memories provided in the image display apparatus. Each memory is divided into four memory areas, and each memory area corresponds to each memory frame in the memory control apparatus. That is, the content of each frame is transferred to the corresponding memory area of the display memory, and the content of the memory area is then displayed on the display device. In this case, the numbering of the memory areas 1 to 12 denotes the order in which the memory areas are displayed.

When the content of the memory area 1 of the memory 11 is displayed on the display device, a start address of the area 1 is designated and the memory 11 is selected. After display, the memory area 1 is switched to the memory area 2, in order to display the content of the memory area 2. In this case, only a "memory switch" is performed because the start address is the same in this memory 11. After display, the memory area 2 is switched to the memory area 3, to display the content of the memory area 3. In this case also, only a "memory switch" is performed.

After displaying the content of the memory area 3, the memory area 3 is switched to the memory area 4 in the memory 11. In this case, it is necessary to switch the start address to a new start address of the memory area 4, in correspondence with the memory switch.

There are, however, problems in the switching of the memory area and start address. That is, when the start address is switched to the new start address after switching the memory, the content of the memory area 1, which is now unwanted, is temporarily displayed on the display device. This is because the timing of memory switch is earlier than that of the start address.

In FIG. 2, reference number 21 represents an image memory in the image control apparatus, 22 a display memory in the image display apparatus, and 23 a display section in the image display apparatus. A display enlargement rate is designated from the image control apparatus side to the image display apparatus side. In this case, the contents of the image memory consisting of 512×512×8 (bits) are transferred to and stored in the memory area at the same size as that of the frame in the display memory consisting of 1024×1280×8 (bits). This stored image is enlarged in accordance with the predetermined rate (in this case, ×2) and displayed on the display device.

However, problems occur when the image data is transferred from the control apparatus to the display apparatus. That is, this transfer is performed by only one display memory and by sequential transmission of every picture element. Therefore, as is obvious, a longer transmission time is needed to transfer the image data.

Figure 3:
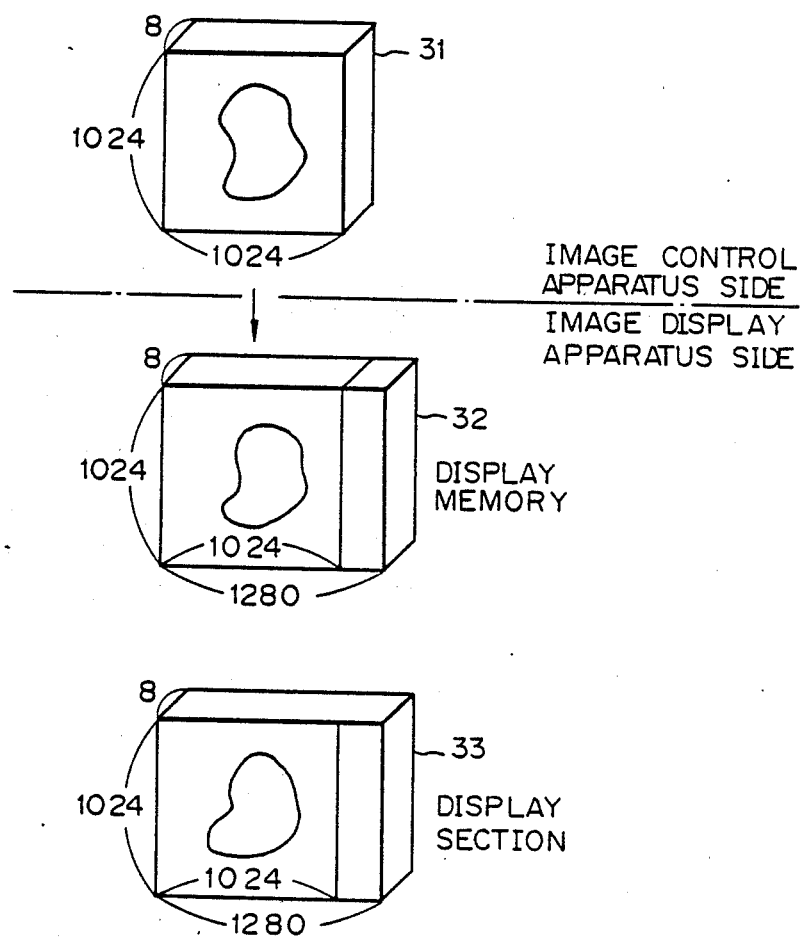
FIG. 3 shows perspective views of an image memory and a display memory in a prior art.

In FIG. 3, reference number 31 corresponds to reference number 21, 32 corresponds to 22, and 33 corresponds to 23 in FIG. 2. In this case, image data is transferred from the image memory to the display memory, and the transfer between the image memory and the display memory is performed at the same image size.

Accordingly, the same problem as in the case of FIG. 2 arises; that the transfer time is too long.

A consecutive image processing system according to the present invention will be explained in detail hereinafter.

Figure 4:
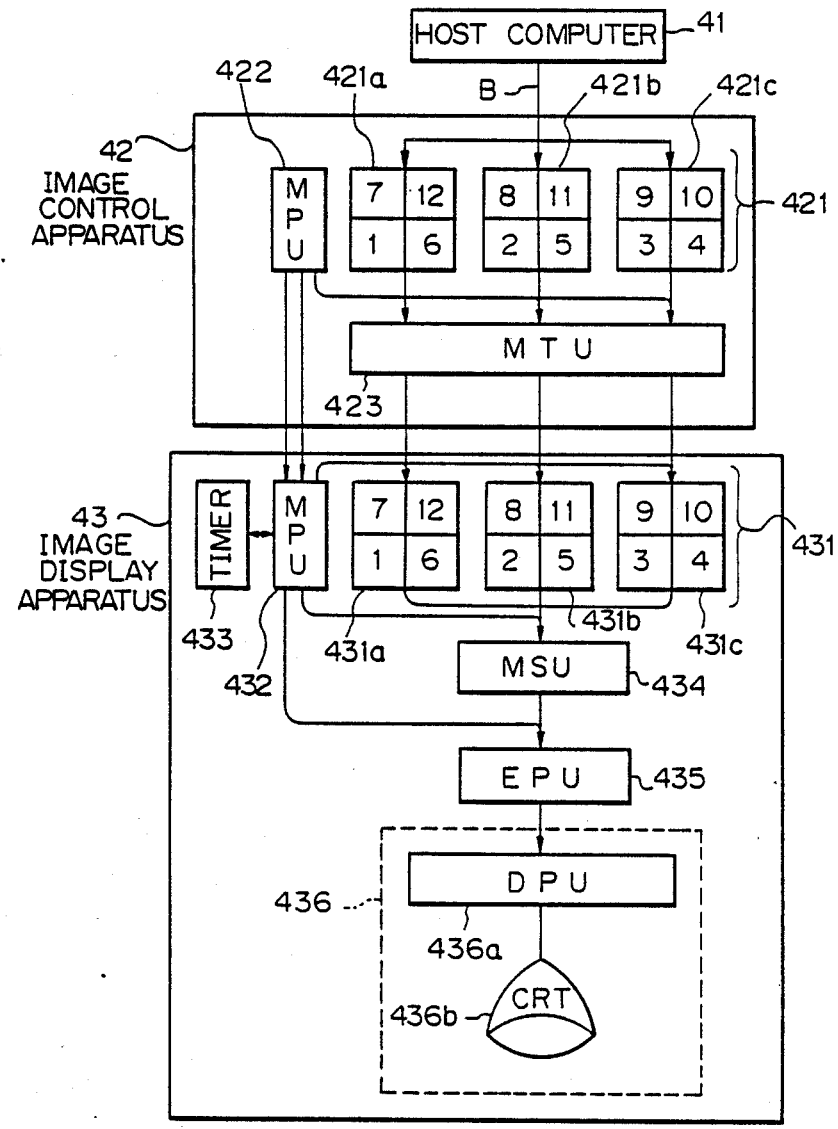
FIG. 4 is a schematic block diagram of a consecutive image processing system according to an embodiment of the present invention.

In FIG. 4, the consecutive image processing system according to an embodiment of the present invention comprises a host computer 41, an image control apparatus 42, and an image display apparatus 43.

The image control apparatus 42 comprises an image memory 421 constituted by three random access memories (RAM's) each storing a number of image frames, a first microprocessor unit (MPU) 422 for controlling the data transmission between the host computer 41 and the image display apparatus 43, and for controlling read-/write operations at the image memory 421, and a memory transmission unit (MTU) 423 for transferring the content of the image memory 421 to the image display apparatus 43.

The image memory 421 is constituted by three image memory units 421a, 421b, and 421c, and each memory units is divided into, for example, four memory areas, i.e., a total of 12 memory areas. In this embodiment, the enlargement rate is doubled. That is, the number of memory areas to be divided is changed in correspondence with the predetermined enlargement rate. Each of the memory units 421a, 421b, and 421c is connected to the host computer 41 through a bus line B. The bus line B includes a data bus line and address bus line, and accordingly, it is possible to access any memory area from 1 to 12 and read out the data therein based on a control program from the host computer 41.

The microprocessor unit (MPU) 422 in the image control apparatus 42 can control the start address of each memory area, can control the transfer of a light and shade signal obtained from each picture element to the host computer 41 and the image display apparatus 43, and can control the write-in of the light and shade signal to the memory area of the designated address. For example, the MPU 422 also can control the write-in of a digital image signal input from an image input apparatus (not shown) by bypassing the host computer 41 to the image memory 421 and using a direct memory access (DMA) method. Accordingly, the MPU 422 generates a signal to ensure the data transmission/reception to and at the image input apparatus (not shown) and the image display apparatus 43.

In the DMA transmission, the first MPU 422 generates a DMA request signal to the host computer 41. When the first MPU 422 receives a DMA acknowledgement signal, the MPU 422 performs an address counter control and a memory chip enable control for storing the digital signal transferred from the image input apparatus in the memory area in the image memory 421. Further, the first MPU 422 generates a control signal for transmission/reception to and at a second MPU 432 in the image display apparatus 43, to transfer an image data of the image memory 421 to the corresponding display memory 431.

For example, the MPU 422 also generates an initial address for DMA transmission, and performs a control for the acknowledgement signal corresponding to the request signal from the MPU 432 after the content of the memory designated by the address is latched and prepared in the memory transfer unit 423. After this control, the MPU 422 performs the address counter control and the chip enable control (memory switch control) based on the initial address, and transfers the image signal to the image display apparatus 43 through the memory transfer unit 423.

In this case, the MPU 432 performs a transfer control and an address control so as to transfer the image data from the image control apparatus 42 and store it in the corresponding memory area in the display memory 431. Moreover, the MPU 422 performs an address read-out counter control and a memory switch control for various memories in order to transfer the image frame of the image memory 421 and store it in the corresponding memory area in the display memory 431. Similarly, the MPU 432 performs the chip enable control for a memory switch at the same time as the address counter control.

Provided in the image display apparatus 43 are the display memory 431, the MPU 432, and the memory switch unit 434. The display memory 431 is constituted by three display memory units 431a, 431b, and 431c. Each unit is also divided into, for example, four memory areas, i.e., a total of 12 memory areas, and each memory unit stores the image frames of the moving images in the corresponding memory area of the display memory units. The memory switch unit 434 is provided for controlling a memory switch when the data is read out from the image frame. That is, the memory switch unit 434 is connected to the display memory 431 and is controlled by a memory switch control signal sent from the MPU 432. The memory switch unit 434 is connected to an enlargement processing unit 435.

As explained above, when the image data is transferred from the image memory 421 to the display memory 431 through the memory transfer unit 423, the size of the image frame is reduced in order to raise the transfer coefficient. Accordingly, the enlargement processing unit 435 is used for enlarging the image frame based on a predetermined enlargement rate, and the output of the enlargement processing unit 435 is applied to a display section 436. The display section 436 includes a display processing unit 436a and a display device (CRT) 436b.

The enlargement rate necessary for the enlargement processing unit 435 is sent from the MPU 432. This enlargement rate is sent from the host computer 41 to the MPU 432 through the MPU 422. In this display section 436, a display start command is sent from the MPU 422 to the MPU 432, and when an address for starting the image display is generated in the MPU 432, the image is displayed on the display device 436b through the display processing unit 435a. Moreover, a clock timer 433 is provided in the image display apparatus 43. This timer 433 is used for asynchronously counting the waiting time from a read-out of the image data of the display memory 431 until a display of the image on the display device 436b.

The operation of the memory switch in the above-explained consecutive image processing system according to one embodiment of the present invention will be explained in detail hereinafter.

Figure 5:
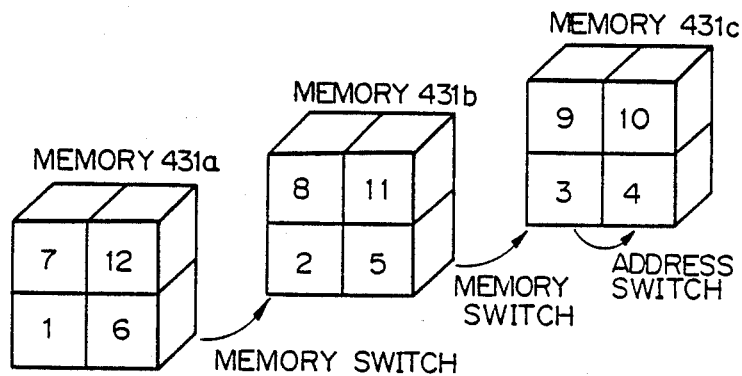
FIG. 5 shows perspective views of the display memories shown in FIG. 4.

In FIG. 5, three display memories 431a, 431b, and 431c correspond to three image memory units 421a, 421b and 421c in the image control apparatus 42. Each display memory 431a, 431b, and 431c is divided into four memory areas (four frames), and the number attached to each frame denotes the order of display thereof on the display device. Moreover, each display memory 431a, 431b, and 431c is used for storing, for example, red (R), green (G), and blue (B) picture elements. That is, the display memory unit 431a stores the R picture element, 431b stores the G picture element, and 431c stores the B picture element. In this case, as explained hereinafter, when a look-up table (LUT) is used for the memory switch, the data in the LUT is displayed by a pseudocolor.

As shown in FIG. 5, the frame 4 is provided in the same memory 431c as the frame 3, and the frame 7 is provided in the same memory 431a as the frame 6. Accordingly, it is not necessary to switch the display memory 431c when the content of the frame 4 is displayed after displaying the frame 3. The relationship between frames 6 and 7 is the same. Consequently, it is possible to prevent a temporary display caused by a memory switch made earlier than an address switch.

This operation will be explained in detail with reference to FIGS. 5, 6A, and 6B.

First, the memory area 1 (frame 1) in the memory 431a is accessed and displayed on the display device. Next, the memory 431b is designated and a memory switch is made from the memory 431a to the memory 431b, and the memory area 2 is accessed and displayed on the display device. Next, the memory 431c is designated and a memory switch is made from the memory 431b to the memory 431c, and the memory area 3 is accessed and displayed on the display device.

Next, as the feature of the present invention, when the area 4 is displayed, a memory switch is not necessary. In this case, only the address is switched to the start address of the area 4, and after the start address is switched, the area 4 is accessed and displayed on the display device. Next, the memory 431b is designated and a memory switch is made from the memory 431c to the memory 431b, and the area 5 is accessed and displayed on the display device. Regarding the memory switch and frame switch from the area 6 to the area 7 and other frames, the control is carried out by the same procedure. Finally, the display on the display device is ended after the area 12 in the memory 431a is displayed.

Figure 6A:
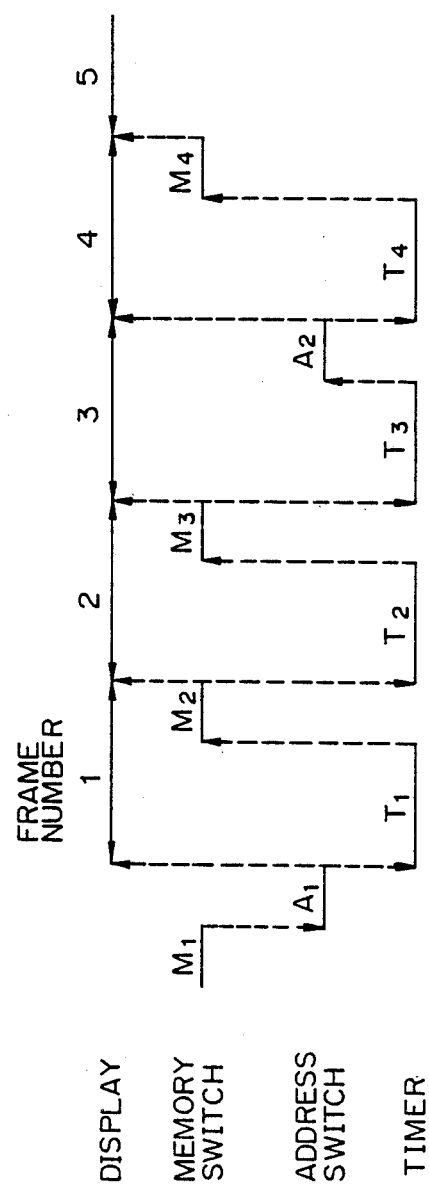
FIG. 6A is a view for explaining a memory switch and address switch of the display memories shown in FIG. 5.

The above-explained procedures are shown in FIG. 6A, and the conventional procedures are shown in FIG. 6B. In these drawings, reference numbers 1 to 5 denote frame numbers to be displayed, $M_1$ to $M_5$ denote timings of the memory switch, $A_1$ and $A_2$ denote timings of the start address switch, and $T_1$ to $T_4$ denote the ON timing of the timer. In FIG. 6A, when the memory switch $M_3$ is made, the frame 3 is displayed during the time $T_3$. After this time, an address switch is made, and the frame 4 is displayed without a memory switch. In FIG. 6B, when a memory switch $M_3$ is made, the frame 3 is displayed during a time $T_3$. After this time, a memory switch $M_4$ is made. In this case, the frame 1 is temporarily displayed because an address switch has not been made at that time. When an address switch $A_2$ is made, the frame 4 is displayed during a time $T_4$. Consequently, as explained in FIG. 6B, an undesirable display temporarily appears on the display device.

Figure 7B:
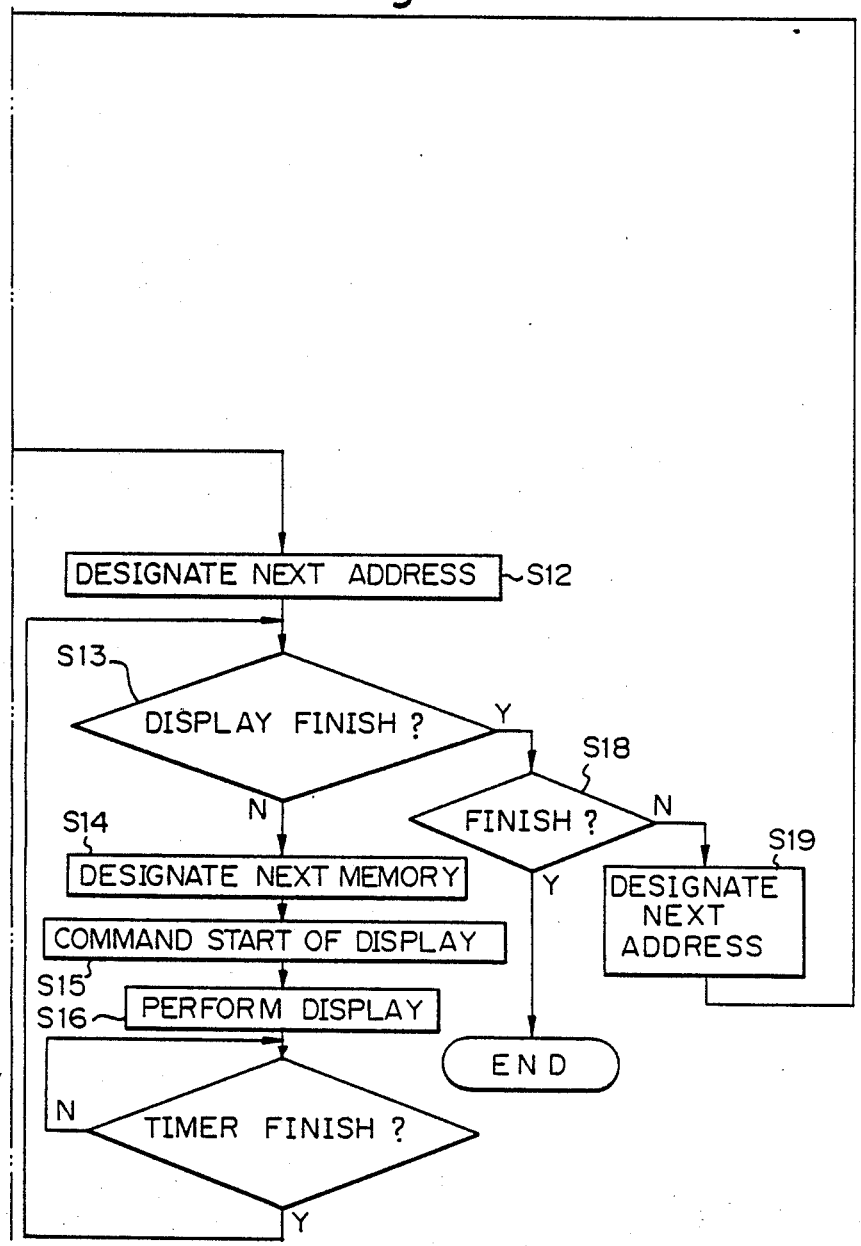

In FIGS. 7A and 7B when the operation is started in the consecutive image processing system, the MPU 422 transfers four frames corresponding to four memory areas 1, 6, 7, and 12 in the memory 421a to the image display apparatus 43 through the memory transfer unit 423 (step S1). The MPU 432 controls the transferred data and writes the image frames into the corresponding memory area in the display memory. In this case, since the MPU 422 controls the address space equal to the frame size from the start address in the image memory 421a by using only the address counter, it is not necessary to perform a memory switch control. Similarly, in the image display apparatus 43, the MPU 432 generates the start address corresponding to the memory area, and thus it is not necessary to perform the memory switch control since the MPU unit 432 controls the write operation by sequentially generating addresses from the address space corresponding to each frame.

When the image transmission/reception with regard to the memory 421a is performed, the MPU 422 switches the image memory from the memory 421a to the memory 421b, and the frames of memory areas in the image memory 421b are transferred to the image display apparatus (step S2). The content of the memory is then stored in the corresponding memory area in the image display apparatus 43. The same procedures as described above are performed regarding the image memory 421c (step S3).

Based on the above-explained procedures, first, the MPU 422 performs a memory switch after controlling the address counter to four frames, second, the MPU 422 controls the memory area in the image memory 421b by controlling the address counter, and finally, the MPU 422 controls the memory area in the image memory 421c by controlling the address counter after the memory switch. The write operations to the display memory 431 are performed in the same way as the above by the MPU 432. That is, the MPU 432 performs the address control of the memory area in the memory 431a, performs a memory switch to the memory area in the memory 431b, and then controls the address of the memory area, and finally, performs a memory switch to the memory area in the memory 431c and then controls the address of the memory area. By the above-explained procedures, all contents in the memory areas 1 to 12 shown in FIGS. 4 and 5 can be transferred from the image memory 421 to the display memory 431.

After these procedures, the MPU 422 transfers the enlargement rate data to the MPU 432 (step S4), and perform a display designation of the memory 421a. When the MPU 422 performs the display designation of the memory 421a, the MPU 432 designates the display memory 431a and sends a control signal for a memory switch to the memory switch unit 434. The memory switch unit 434 outputs the frames of the memory area 1 in the memory area 431a and then these outputs are enlarged in the enlargement processing unit 435 (step S6). After enlargement, the MPU 422 commands a display start designation, then the MPU 432 activates the display processing unit 436a, and thus the display processing unit 436a controls the frames of the memory areas in the memory 431a and displays them on the display device 436a (steps S7 and S8).

The MPU 432 also activates the timer 25, and waits until the memory area 1 is displayed on the display device 436b. After the desired time has lapsed (step S9), the MPU 432 judges whether or not all frames are displayed (step S10). When the memory area 2 in the memory 431b and the memory area 3 in the memory 431c have not yet been displayed, although the memory area 1 is in the memory 431a, the MPU 432 performs the display designation of the next memory (step S11) shown by the route A. That is, when the MPU 432 generates the start address designating the memory area 2 of the memory 431b, the MPU 432 performs the display based on the display start designation signal. After confirming the finish of the timer operation, when the memory area 2 is displayed, the MPU 432 performs a memory switch to the memory 431c and the memory area 3 in the memory 431c is displayed. After passing this route A, the MPU 432 designates the final address of the memory area 3 in the memory 431c.

In the present invention, the MPU's 422 and 432 do not perform a memory switch in the next procedure, and only an address switch is performed from the memory area 3 to the memory area 4 in the memory 431c. That is, only a start address conversion is performed (step S12). The MPU 432 judges whether or not the display of the memory area 1 is finished (step S13). At this step, since the display is performed for the memory area 3, the display finish of the memory 431a becomes "NO" ("NO" at step S13). Accordingly, the MPU 422 sends a command for the display start to the MPU 432, and when the MPU 432 activates the display processing unit 436, the memory area 4 of the memory 431c is displayed on the display device. The timer connected to the 432 counts the lapse of time, the next memory area 2 is designated after the timer operation is finished, and the MPU 432 again judges whether or not the display of the memory 431 is finished (step S14). Since the memory 431a is not accessed, the memory area 5 of the memory 431b is accessed and displayed after designating the display start and controlling the display process. During this time, the timer 433 counts the lapse of time, and the memory 431a is accessed after the count by the timer 433 is finished (step S15). Since the display of the memory 431a is not displayed, the MPU 432 performs the display start designation and the memory area 6 of the memory 431a is displayed.

The timer 25 counts the lapse time during this time, and the MPU 432 judges whether or not the display of the memory area 1 is finished after the timer count is finished. At this time, since the memory area 6 of the memory 431a is already displayed, "YES" is selected (step S18). Next, the judgement is made of whether or not the operation is finished. Since the operation is not finished, a next address designation is performed (step S19). That is, the memory switch from the memory 431a to the other memory is not performed, and the MPU 432 performs the address conversion so as to designate the memory area 7 of the memory 431a. That is, the route B is selected. The procedures after displaying the memory area 7 are the same as that for the memory areas 1 to 3. After displaying the memory area 9, only the address switch is performed to the memory area 10 in the memory 431c, and after displaying the memory area 12, the display on the display device can be smoothly finished.

Figure 8:
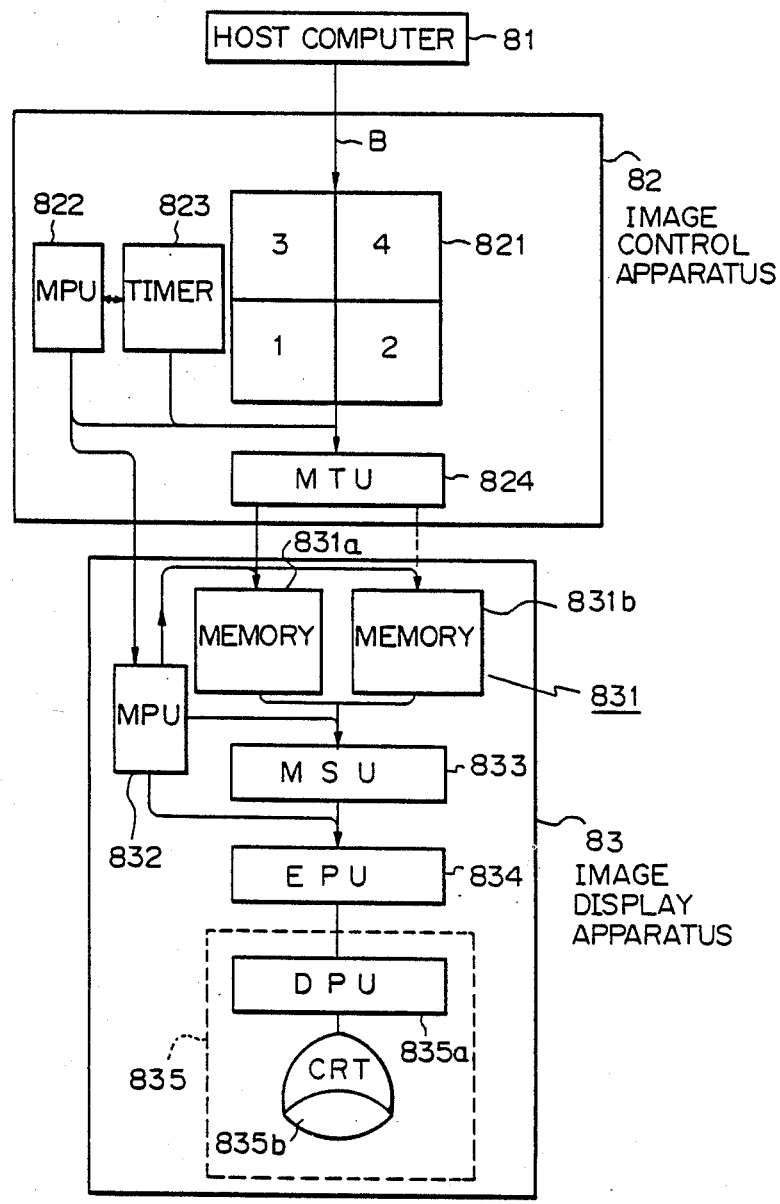
FIG. 8 is a schematic block diagram of a consecutive image processing system according to another embodiment of the present invention.

In FIG. 8, the image control apparatus 82 comprises an image memory 821 consisting of a RAM and divided into four memory areas 1 to 4, an MPU 822 for controlling the data transfer between the host computer 81 and the image control apparatus 82 and for controlling read/write operations from and to the image memory 821, a memory transfer unit (MTU) 824 for controlling the transfer of the frames in the image memory 821 to an image display apparatus 83, and a timer 823.

Figure 9:
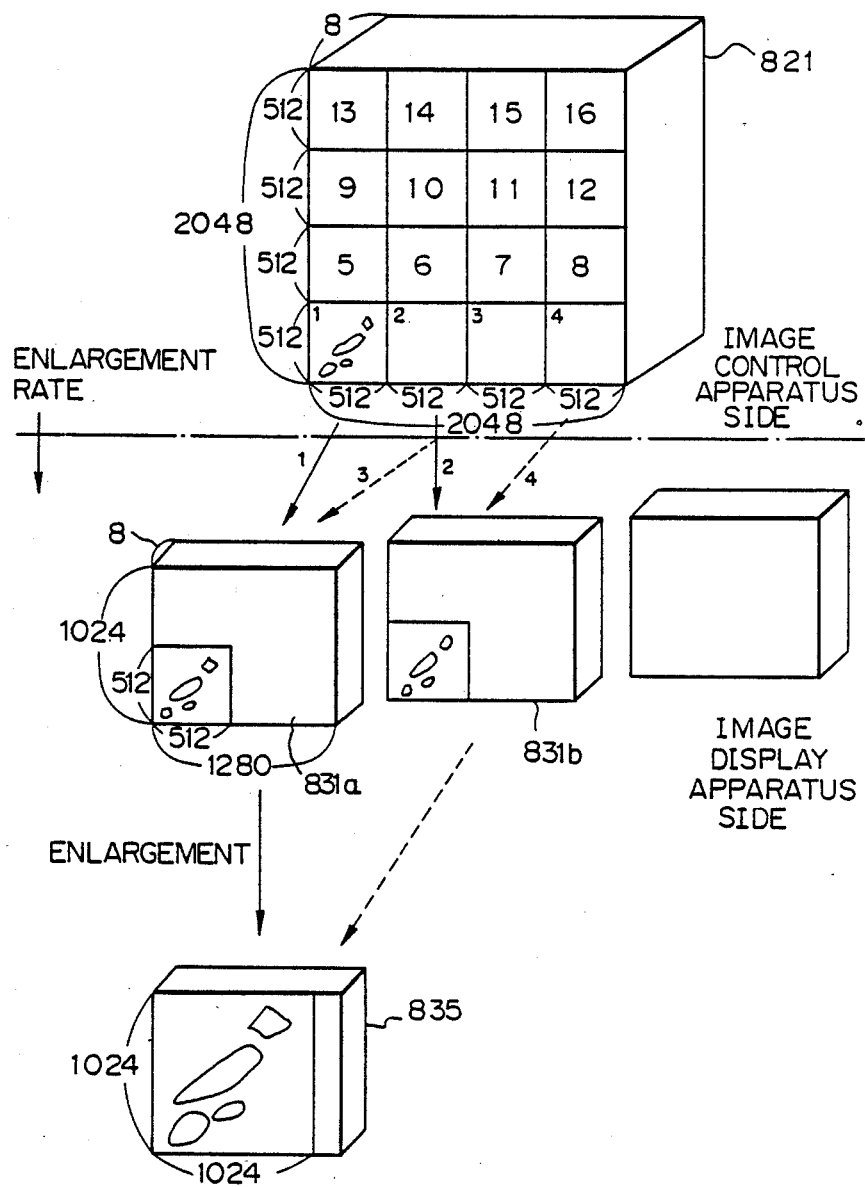
FIG. 9 shows perspective views of an image memory and display memories shown in FIG. 8.

The image memory 821 is divided into, for example, sixteen memory areas 1 to 16, so as to store sixteen frames as shown in FIG. 9. In FIG. 8, only four frames 1 to 4 are shown in the image memory 821 to simplify the explanation thereof.

The image display apparatus 83 comprises two display memories 831a and 831b for storing image frames to the corresponding memory area, and a memory switch unit 833 for selecting the memory area designated by the MPU 832. That is, the memory switch unit 833 is connected to the output of the display memory 831 and is controlled by a memory switch control signal from the MPU 832. The output of the memory switch unit 833 is connected to the enlargement processing unit 834 for enlarging the image data to be displayed.

In this embodiment, the image data in the image memory 821 is alternately transferred to the display memories 831a and 831b, and the consecutive images are displayed by the commands of the enlargement rate and the display memory designation sent from the MPU 822. Moreover, in this embodiment, it is possible to freely switch the memory size, and it is also possible to smoothly display consecutive images for the "loop-movie" technique by providing a plurality of display memories in the image display apparatus.

In FIG. 9, the image memory 821 is divided into, for example, sixteen memory areas (frames) 1 to 16. The light and shade signal for each picture element is composed of eight bits. Accordingly, the image memory 821 is constituted by 2048×2048×8 (bits) as the memory size. Each memory area comprises 512×512×8 (bits). In the image display apparatus, the display memory 831 comprises at least two display memory units 831a and 831b, and each memory unit 831a and 831b comprises 1024×1280×8 (bits) as the memory size. These frames are alternately displayed on the display section after enlargement based on the predetermined enlargement rate. That is, first, the frame 831a is displayed as shown by the solid line, and second, the frame 831b is displayed as shown by the dotted line.

In this embodiment, first, the image frame 1 of the image memory 821 is transferred to the display memory 831a as shown by the arrow 1, second, the frame 2 of the image memory 821 is transferred to the display memory 831b as shown by the arrow 2, third, the frame 831a is displayed on the display section 835, and finally, the frame 831b is displayed on the display section 835. At that time, when the frame 831b is read out and displayed, the next image frame 3 of the image memory 821 is transferred to the display memory 831a as shown by the dotted arrow 3. When the frame 831a is displayed, the next image frame 4 of the image memory 821 is transferred to the display memory 831b as shown by the dotted arrow 4. As is obvious from the above-explanations, the display can be consecutively performed as a "loop-movie" display, since the frames are alternately transferred to the empty display memory side.

For example, when sixteen frames are transferred as shown in FIG. 9, first, the frame 1 is transferred to the display memory 831a, and then the frame 2 to the memory 831b. After transferring these frames, the frame 831a is enlarged and displayed, and then the frame 831b is also enlarged and displayed. Consequently, it is possible to obtain consecutive images as a "loop-movie" on the display section 835.

Figure 10:
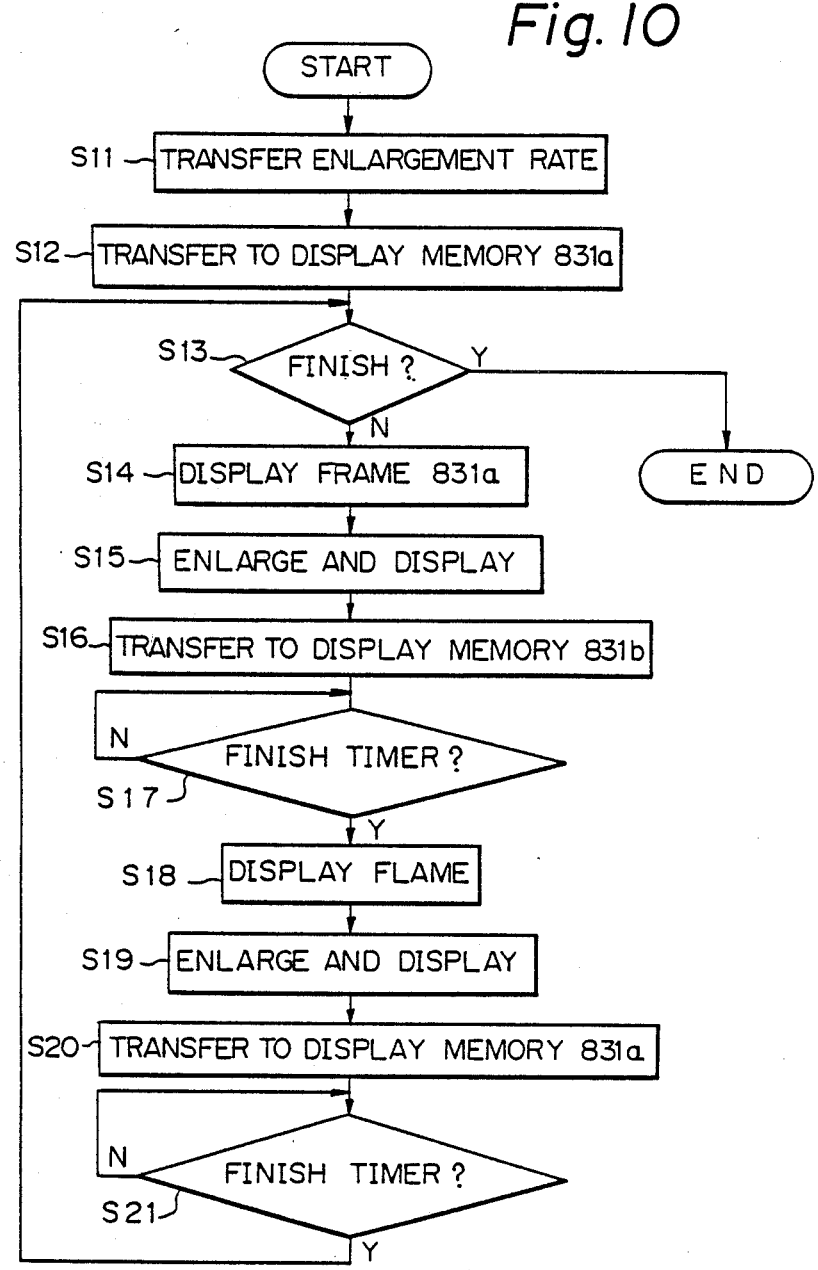
FIG. 10 is a flowchart for explaining the procedures for transfer and display in the consecutive image processing system shown in FIG. 8.

In FIG. 10, when the image control apparatus and the image display apparatus are activated, the MPU 822 transfers the enlargement rate value to the MPU 832 (step S11). Next, the frame 1 of the image memory 821 is transferred to the display memory 831a (step S12). The MPU 822 judges whether or not all transfers of the frames are finished (step S13). When all transfers are not finished, the frame 831a is enlarged and displayed on the display section (steps S14 and S15). During the above step, the even number frame 2 of the image memory 821 is transferred to the display memory 831b (step S16). The transfer time is controlled by the timer 823 and is judged whether or not it is finished (step S17).

When the frame 2 of the image memory 821 is transferred to the display memory and finished, the frame 2 of the display memory 831b is enlarged by the enlargement processing unit 834 and is displayed by the display section 835 (steps S18 and S19). Next, the odd number frame 3 of the image memory 821 is transferred to the display memory 831a (step S20). The transfer time is also controlled by the timer 823 (step S21). These procedures are repeated until the frame 16 of the image memory 821 is transferred and displayed on the display section 835.

Figure 11:
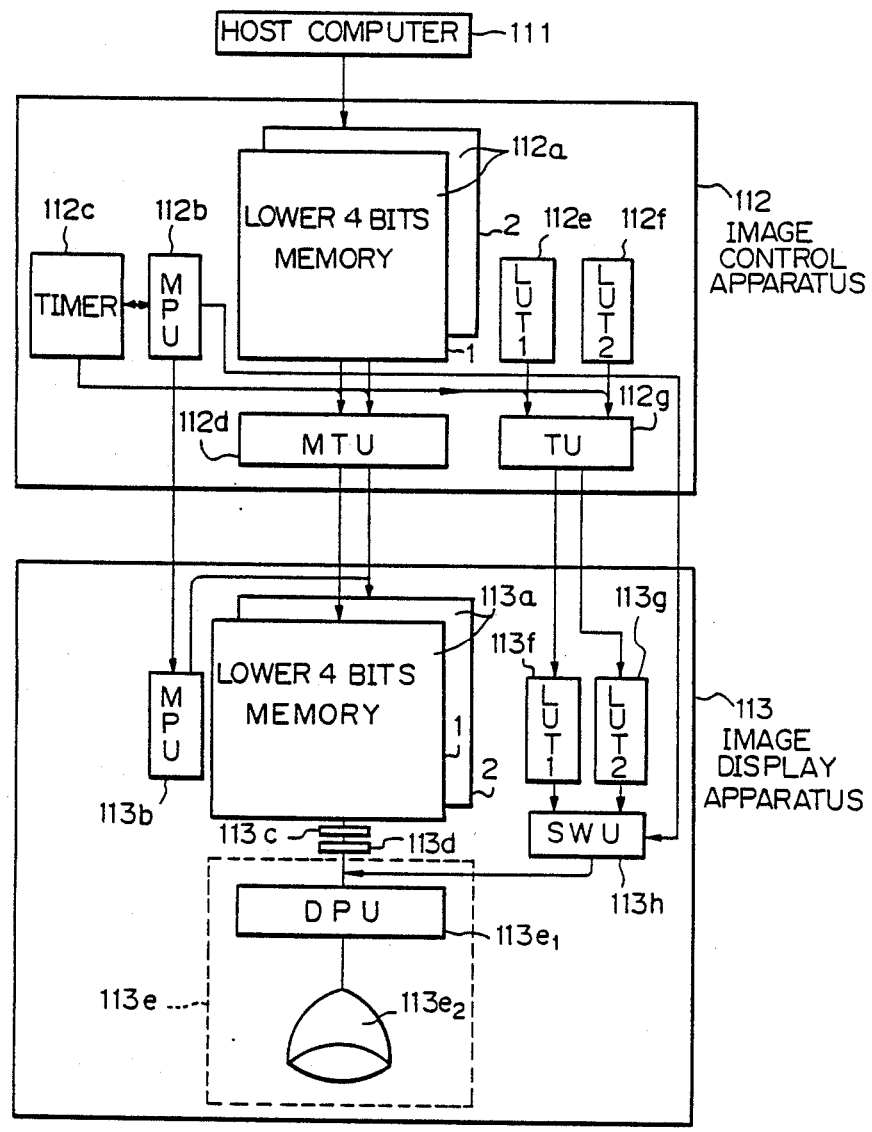
FIG. 11 is a schematic block diagram of a consecutive image processing system according to still another embodiment of the present invention.

In FIG. 11, the image control apparatus 112 comprises an image memory 112a divided into a lower four bits memory portion 1 and a upper four bits memory portion 2, an MPU 112b for controlling the data transfer between the host computer 111 and the image control apparatus 112 and for read/write operations from and to the image memory 112a, a memory transfer unit (MTU) 112a for controlling the transfer of the frames in the image memory 112a to an image display apparatus 113, a timer 112c for counting the transfer time, two look-up tables (LUT 1 and LUT 2) 112e and 112f for storing light and shade data of the image, and a look-up table transfer unit (TU) 112g for transferring the contents of the look-up tables 112e and 112f.

Figure 12:
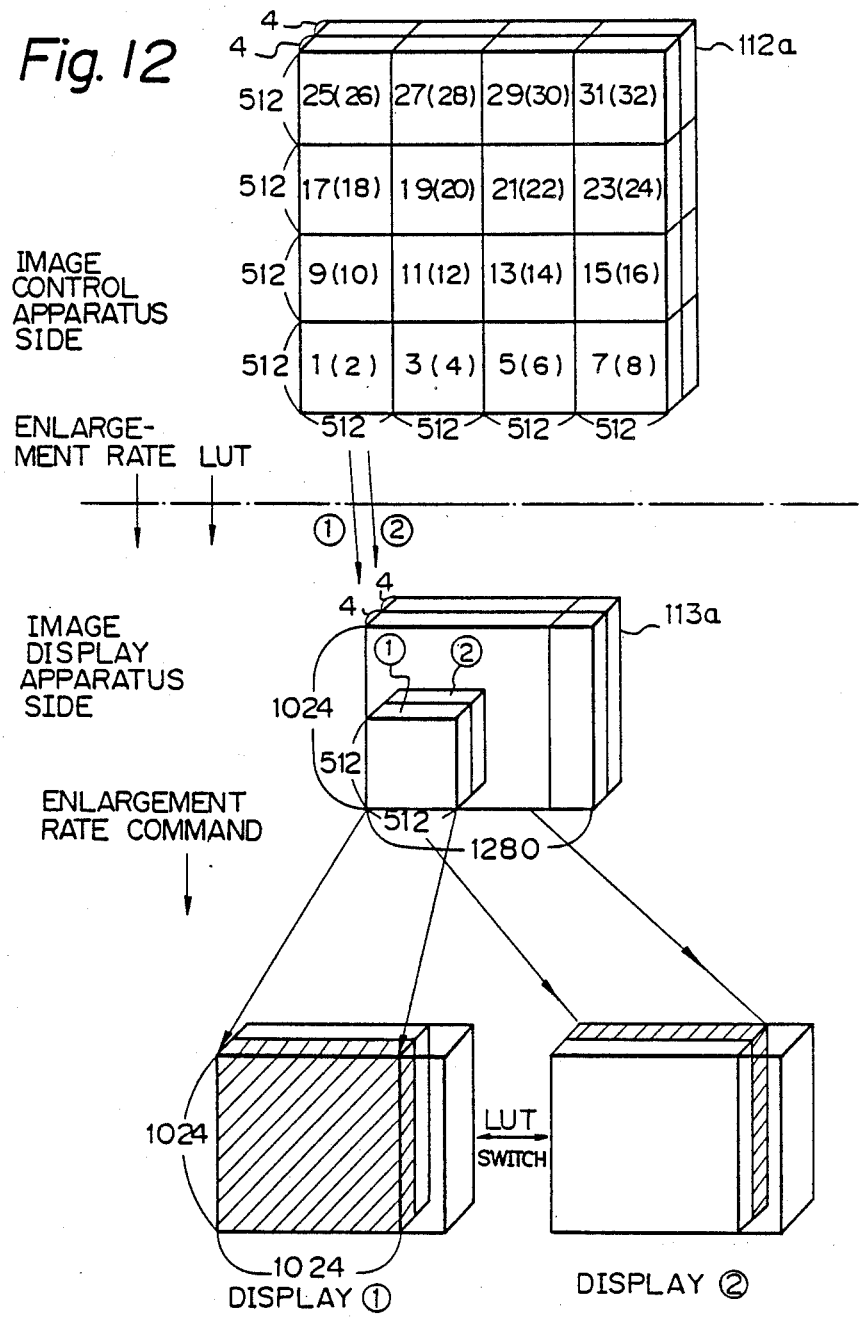
FIG. 12 shows perspective views of an image memory and display memories shown in FIG. 11.

The image memory 112a is divided into, for example, sixteen memory areas so as to store sixteen frames, and is also divided into two groups, i.e., the lower four bits portion 1 and the upper four bits portion 2, as shown in FIG. 12.

The image display apparatus 113 comprises a display memory 113a also divided into lower and upper bits portions, an MPU 113b, and a selector unit 113c for selecting either the lower 4 bits portion or the upper 4 bits portion. The selector unit 113c is connected to the output of the display memory 113a and is controlled by a control signal for selection from the MPU 113b. The selector unit 113c is connected to an enlargement processing unit 113d, and the enlargement processing unit 113d is connected to the display section 113e. Moreover, the image display apparatus 113 comprises two look-up tables (LUT 1 and LUT 2) 113f and 113g for storing light and shade data of the image and a look-up table switch unit (SWU) 113h for switching the look-up tables 113f and 113g.

The enlargement rate and memory switch command are sent from the host computer 111 to the MPU 112b, and then sent from the MPU 112b to the MPU 113b. The MPU 113b sends the enlargement rate data to the enlargement processing unit 113d. The timer 112c is used for asynchronously counting waiting times until the image frame in the image memory 112a is read out and transferred to the display memory, and then displayed on the display section.

In this embodiment, each frame comprises four bits depth, and overlaps the other four bits frames as shown in FIG. 12. Briefly, the lower 4 bits frame is transferred to the corresponding display memory 113a, and at the same time, the enlargement rate and LUT command are applied. When the lower 4 bits frame is displayed, the other image frame is transferred to the other display memory. As can be understood, when the lower 4 bits frame is displayed, the upper 4 bits frame is transferred from the image memory 112a. These steps are alternately performed between the lower frame and upper frame by switching the look-up tables 1 and 2, and consecutive images as a "loop-movie" are obtained from these operations.

In FIG. 12, the image memory 112a comprises 2048×2048×(4+4) (bits) as the memory size. Each image frame is divided into a lower 4 bits portion (front half) and an upper 4 bits portion (rear half). Accordingly, the image memory 112a comprises substantially thirty-two frames 1 to 32, and the display memory 113a comprises 1024×1280×(4+4) (bits) as the display memory size. In this embodiment, first, the front half portion of the frame 1 is transferred to the lower 4 bits area as shown by arrow ① and the rear half portion of the frame 2 is transferred to the upper 4 bits area of the display memory 113a. After transferring these frames, the transferred data is enlarged and displayed. The transfer and display are alternately performed by control of the look-up table (LUT 1 and LUT 2).

Figure 13:
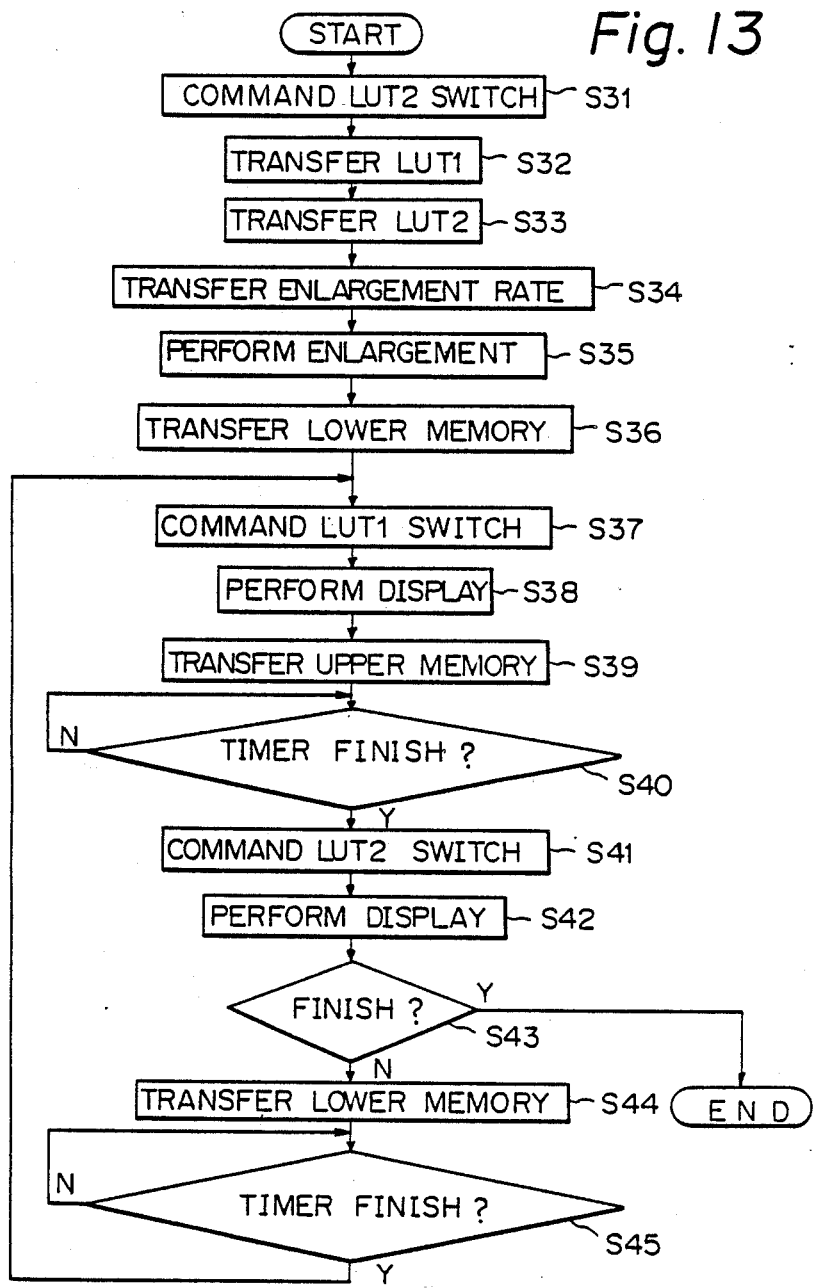
FIG. 13 is a flowchart of the transfer and display procedure in the consecutive image processing system shown in FIG. 11.

In FIG. 13, when the operation starts, the look-up table in the image control apparatus is switched to the LUT2 (step S31). next, the content of the LUT1 and the LUT2 is transferred to the image display apparatus through the TU 112g (steps S32 and S33). Then the enlargement rate is transferred to the image display apparatus 113 (step S34) and the transfer image is enlarged (step S35). In this step, the transfer image is not displayed. Next, the lower bits memory corresponding to the LUT1 is transferred to the image display apparatus 113. In this step, the image is not displayed since the look-up table is not switched to the LUT1. The look-up table is then switched to the LUT1 (step S37), In this step, the image is displayed on the display device (step S38). They, the upper bits memory is transferred to the image display apparatus (step S39). The timer is then used to determine whether or not the display of the lower bits memory is finished, (step S40). When the timer count is finished the look-up table is switched to the LUT2 (step S41) and the upper bits memory is displayed on the display device (step S42). Next, it is determined whether or not the display processing is finished (step S43). When the display processing is finished (YES), the procedure is completed (END). When the display processing is not finished, the lower bits memory is transferred (step S44). Next, it is determined whether or not the timer count is finished (step S45). When the timer count is finished, the flow is returned to step S37.

The embodiment shown in FIG. 14 is a combination of the above first and third embodiments. That is, each display memory is divided into, for example, four memory areas, and each of the four memory areas is divided into a lower bits portion and an upper bits portion. Accordingly, for example, the display memory 141 is divided into a lower bit portion 141a and an upper bit portion 141b, and each portion comprises four memory areas. The frame numbers indicate the order of display of the frames.

As is obvious, this embodiment include the merits of the above two embodiments. That is, a memory switch, address switch, and LUT switch are smoothly performed, and thus it is possible to obtain consecutive images as a "loop-movie" in the consecutive image processing system.

What is claimed is:

1. A consecutive image processing system for smoothly and consecutively processing image data when transferring and displaying said image data stored in image memories and display memories, said system comprising:
   a host computer;
   an image control means for controlling a display of images, having a plurality of image memories divided into a plurality of memory areas for storing image frames having a display order, said display order being applied to allow performance of a display based on either a memory switch or an address switch so that the memory switch and address switch are not performed simultaneously, and a first microprocessor unit for commanding an enlargement rate, a memory transfer, and a display start based on a command from said host computer; and
   an image display means for displaying images, having a plurality of display memories each divided into a plurality of memory areas corresponding to said image memories for storing image frames to be displayed, each image frame having a display order corresponding to said image memories, and a second microprocessor unit for commanding a memory switch and a start address of an enlarged image under said enlargement rate based on a command from said first microprocessor unit.

2. A system as claimed in claim 1, wherein said image control means further comprises a memory transfer unit for transferring image data to said corresponding display memory based on said command from said first microprocessor unit.

3. A system as claimed in claim 1, wherein said image display means further comprises a timer for counting a transfer time and a display time, a memory switch unit for switching said image memories and enlargement processing unit for enlarging image data based on said enlargement rate, and a display section for displaying said image data on said display device.

4. A consecutive image processing system for smoothly and consecutively processing image data when transferring and displaying said image data stored in image memories and display memories, said system comprising:
   a host computer;
   an image control means for controlling a display of images, having an image memory divided into a plurality of memory areas for storing image frames having a display order, a timer for counting a transfer time and a display time, and a first microprocessor unit for commanding a memory transfer and display start based on a command from said host computer; and
   an image display means for displaying images, having two display memories, each display memory being alternately displayed, and when one display memory is displayed, said image data in said image memory is transferred to the other display memory, and a second microprocessor unit for command a memory switch and a start address based on a command from said first microprocessor unit.

5. A system as claimed in claim 4, wherein said image control means further comprises a memory transfer unit alternately transferring said image data to said each display memory.

6. A system as claimed in claim 4, wherein said image display means further comprises a memory switch unit for switching said display memories, an enlargement processing unit for enlarging said image data based on a predetermined enlargement rate, and a display section for displaying said image data on a display device.

7. A consecutive image processing system for smoothly and consecutively processing image data when transferring and displaying said image data stored in image memories and display memories, said system comprising:
   a host computer;
   an image control means for controlling a display of images, having an image memory divided into a lower bits portion and an upper bits portion, each portion being divided into a plurality of memory areas, two look-up tables for storing light and shade data of said image data corresponding to said portion, a timer for counting a transfer time and a display time, and a first microprocessor unit for commanding a look-up table transfer and a display start based on a command from said hose computer; and
   an image display means for displaying images, having a display memory divided into a lower bits portion and an upper bits portion corresponding to said image memory, each portion being alternately displayed, and when one display memory is displayed, said image data in said image memory is transferred to the other display memory, two look-up tables for storing contents corresponding to look-up tables in said image control means, and a second microprocessor unit for commanding a memory switch and a start address based on a command from said first microprocessor unit.

8. A system as claimed in claim 7, wherein said image control means further comprises a memory transfer unit for transferring said image data said lower and upper bits portions, and a look-up tables transfer unit for alternately transferring contents of said look-up tables.

9. A system as claimed in claim 7, wherein said image display means further comprises a look-up table switch unit for alternately switching said look-up table, and a display section for displaying said image data on a display device.

10. A consecutive image processing system for smoothly and consecutively processing image data when transferring and displaying said image data stored in image memories and display memories, comprising:
    host computer means for processing data;
    image display means for displaying said image data, comprising a plurality of image memories for storing said image data, each memory being divided into a plurality of memory areas, and each memory area being divided into lower and upper bits portions; and image control means for controlling said image display means such, that said image data in each of said memory areas is alternately transferred and displayed.

* * * * *